V. W. MOYER.
TEMPER SCREW YOKE.
APPLICATION FILED AUG. 12, 1920.

1,397,595.

Patented Nov. 22, 1921.

Inventor
Virgil W. Moyer

Witness
Edwin L. Bradford

By
Church Church
his Attorneys

UNITED STATES PATENT OFFICE.

VIRGIL WARREN MOYER, OF PAWHUSKA, OKLAHOMA.

TEMPER-SCREW YOKE.

1,397,595.

Specification of Letters Patent.   Patented Nov. 22, 1921.

Application filed August 12, 1920.   Serial No. 403,038.

*To all whom it may concern:*

Be it known that I, VIRGIL WARREN MOYER, a citizen of the United States, residing at Pawhuska, in the county of Osage and State of Oklahoma, have invented certain new and useful Improvements in Temper-Screw Yokes; and I do hereby declare the following to be a full, clear, and exact description of the same, reference being had to the accompanying drawings, forming part of this specification.

This invention relates to that type of yoke adapted for use in connection with that class of devices employed in drilling gas, oil and Artesian wells known as "temper screws".

In present day practice the feed screw of well drilling apparatus is inclosed in a frame, the sides of the frame being known as the reins and the lower end of the frame being in the form of a threaded split nut. The temper screw yoke surrounds the split nut and a yoke screw threaded through an aperture in one side of the yoke compresses the split nut around the feed screw. Heretofore, the side of the yoke opposite the yoke screw has been provided with an aperture and a set screw extending through said aperture into the split nut has been the sole means of securing the yoke to the frame with the result that the constant jarring of the feed screw and frame breaks the screw and loosens the yoke. Furthermore, the single set screw takes very little bearing on the nut and as a consequence the yoke has a tendency to wabble or tilt, causing the threads on the yoke screw and in the yoke screw aperture to quickly become worn.

The object of the present invention, therefore, is to provide a temper screw yoke that can be conveniently and securely attached to the frame and will maintain itself in such position that the life of the threads on the yoke screw and yoke screw aperture will be greatly prolonged.

In the accompanying drawings:—

Figure 1:
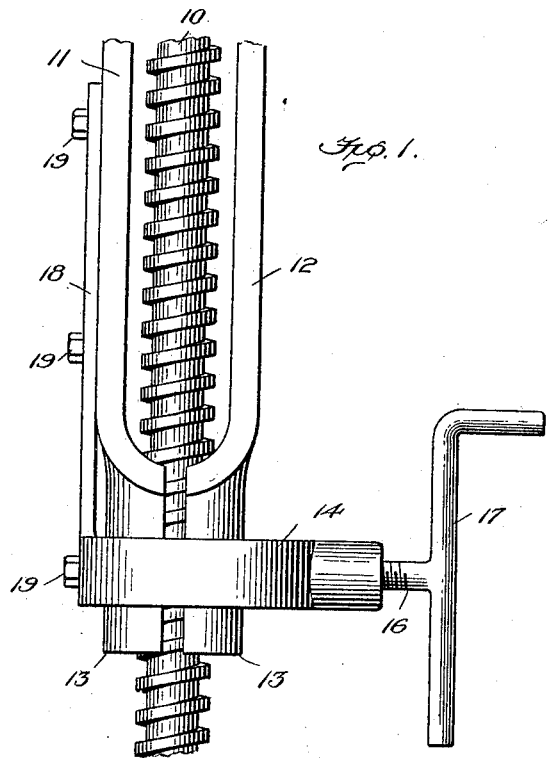
Figure 2:
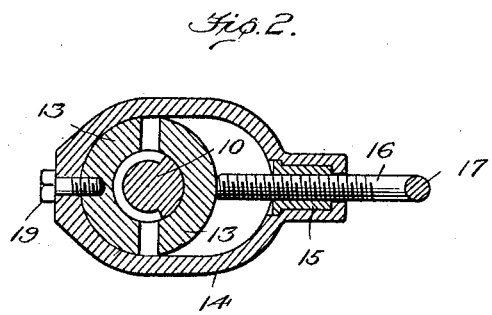

Figure 1 is an elevational view showing the yoke and lower portion of a frame assembled on the feed screw; and Fig. 2 is a section through the yoke.

The main feed screw 10 extends between reins 11 and 12 of the frame and the split nut 13 at the lower end of the frame, each rein forming one section of said nut.

The yoke 14 is provided with a cylindrical bore serving as a seat for a similarly shaped bushing 15 threaded internally to receive the yoke screw 16, the outer end of said screw having a handle 17 formed thereon for actuating the screw. On the side opposite the yoke screw aperture the yoke 14 is also provided with an elongated brace 18 preferably formed integral with the yoke and this brace is adapted to take an extended bearing against the rein 11 of the frame.

Yoke 14 and the brace or bearing member 18 are rigidly attached to the split nut 13 and rein 11, respectively, by a series of screws 19 extending through a corresponding number of apertures in the brace and yoke into threaded recesses in the frame. Due to the extended bearing that brace 18 takes against the rein the yoke cannot tilt or wabble on the nut thus preventing undue wear on the screw threads of the yoke screw and aperture. The brace 18 also permits of such rigid attachment of the yoke to the frame that the jarring occurring during the drilling operations is not detrimental to the screws 19.

What is claimed is:—

1. A yoke for temper screws having a threaded opening in one side for the yoke screw and an upwardly extending brace on its opposite side.

2. A yoke for temper screws, said yoke having an elongated brace connected thereto and extending substantially parallel to the axis of the yoke.

3. The combination with a frame comprising a split nut and a rein extending upwardly from each section of said nut, and a temper screw yoke, an upwardly extending brace formed on the yoke and taking an extended bearing on one of said reins, and means for securing said brace to one of said reins.

4. The combination with a frame comprising a split nut and a rein extending upwardly from each section of said nut, of a temper screw yoke, said yoke having an integral, upwardly extending member adapted to take an extended bearing against one of said reins, means for securing said member to said rein, and means for securing the yoke to the nut.

VIRGIL WARREN MOYER.